United States Patent
Mantell et al.

(10) Patent No.: US 9,185,923 B2
(45) Date of Patent: Nov. 17, 2015

(54) PRINTING 3D TEMPERED CHOCOLATE

(71) Applicant: Xerox Corporation, Norwalk, CT (US)

(72) Inventors: David Allen Mantell, Rochester, NY (US); Andrew W. Hays, Fairport, NY (US); Zahra C. Langford, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 204 days.

(21) Appl. No.: 13/666,428

(22) Filed: Nov. 1, 2012

(65) Prior Publication Data

US 2014/0120229 A1    May 1, 2014

(51) Int. Cl.
| | |
|---|---|
| *B02B 1/08* | (2006.01) |
| *A23G 1/00* | (2006.01) |
| *B29C 67/00* | (2006.01) |
| *A23G 1/50* | (2006.01) |
| *A23G 1/54* | (2006.01) |
| *A23G 3/34* | (2006.01) |

(52) U.S. Cl.
CPC ............ *A23G 1/0066* (2013.01); *A23G 1/0056* (2013.01); *A23G 1/50* (2013.01); *A23G 1/54* (2013.01); *A23G 3/0097* (2013.01); *B29C 67/0059* (2013.01)

(58) Field of Classification Search
CPC ............ A23G 1/04; A23G 3/00; A23G 1/56; A23G 1/02; A23G 1/30; A23L 1/00; A23P 1/00
USPC ......... 426/515, 520, 491, 306, 593, 289, 631, 426/302, 303, 304, 305, 307, 103
See application file for complete search history.

(56) References Cited

U.S. PATENT DOCUMENTS

| | | | | |
|---|---|---|---|---|
| 2,786,764 | A | * | 3/1957 | Rivoche .................... 426/92 |
| 3,044,123 | A | * | 7/1962 | Grubangh .................. 264/3.4 |
| 5,085,890 | A | * | 2/1992 | Niaura et al. .............. 427/149 |

(Continued)

FOREIGN PATENT DOCUMENTS

| | | | | |
|---|---|---|---|---|
| CN | 201033488 | * | 12/2008 | ............ B41J 3/407 |
| EP | 0498357 | * | 3/1992 | ............ A23G 3/28 |

(Continued)

OTHER PUBLICATIONS

Daniel L. Cohen et al., "Hydrocolloid Printing: A Novel Platform for Customized Food Production", pp. 1-11. http://creativemachines.cornell.edu/sites/default/files/SFF09_Cohen1_0.pdf, accessed Oct. 31, 2012.

(Continued)

*Primary Examiner* — Preston Smith
(74) *Attorney, Agent, or Firm* — MH2 Technology Law Group LLP

(57) ABSTRACT

A method for printing a three-dimensional crystalline structure such as a chocolate layer wherein, after printing, the material has a desired crystal structure. An embodiment can include printing a liquid first layer of material with a printer onto a second layer of material having a crystal structure. Subsequently, the printed liquid first layer is processed to solidify the first layer. During the processing of the printed liquid first layer, the second layer functions as a crystal seed layer through physical contact with the printed liquid first layer and the second layer crystallizes with the crystal structure.

19 Claims, 3 Drawing Sheets

(56) References Cited

U.S. PATENT DOCUMENTS

| | | | |
|---|---|---|---|
| 6,302,677 B1 * | 10/2001 | Suttle et al. | 425/373 |
| 2010/0221373 A1 * | 9/2010 | Chen et al. | 425/3 |
| 2012/0251688 A1 | 10/2012 | Zimmerman et al. | |
| 2012/0251689 A1 | 10/2012 | Batchelder | |

FOREIGN PATENT DOCUMENTS

| | | |
|---|---|---|
| WO | 9830111 A1 | 7/1998 |
| WO | 2012076205 A1 | 6/2012 |

OTHER PUBLICATIONS

Deborah Southerland et al., "Edible 3D Printing", NIP 27 and Digital Fabrication 2011, Technical Program and Proceedings, 2011 Society for Imaging Science and Technology, pp. 819-822.

University of Exeter, "University of Exeter announces spin out company for 3D chocolate printing", Apr. 7, 2012, p. 1. http://www.exeter.ac.uk/news/university/title_201237_en.html, accessed Oct. 31, 2012.

Extended European Search Report dated Jan. 17, 2014, European Application No. 13190239.7, filed Oct. 25, 2013, pp. 1-5.

* cited by examiner

PRINTING 3D TEMPERED CHOCOLATE

FIELD OF THE EMBODIMENTS

The present teachings relate to the field of forming crystal structures and more particularly to methods for printing a layer having a desirable crystal structure, for example a chocolate layer having a desirable degree of crystallization or temper.

BACKGROUND OF THE EMBODIMENTS

Various compounds can have different crystal structures depending on factors such as temperature. For example, chocolate, and more particularly cocoa butter within chocolate, can generally have one of six crystal structures depending on how it is produced. The crystal structures range from type I to type VI with each crystal type having a different melting point. Generally accepted melting points of cocoa butter crystal types are as follows: type I: 17° C.; type II: 21° C.; type III: 26° C.; type IV: 28° C.; type V: 34° C.; type VI: 36° C. Type VI crystals require an extended duration of time (a matter of months) to form and are not found in typical chocolate.

Tempering of chocolate during production is necessary to produce a product with as many type V crystals as possible, which is the cocoa butter crystal structure typically used for consumer chocolate. To temper chocolate to produce type V crystals, the chocolate can be heated to a temperature which is higher than the type IV crystal melting temperature, for example 31° C. to 32° C. for a duration of time which is sufficient to melt the type I to type IV crystals, then cooled. During the cooling, the type V crystals that remain function as crystallization nuclei, around which other type V crystals will form.

In another method of forming type V cocoa butter crystals, a solid seed chocolate having a preponderance of type V crystal structures is dispensed into a melted chocolate which is at a temperature between the type IV and type V crystal melting point. The type V crystals in the solid chocolate function as crystallization nuclei for the molten material such that the melted chocolate crystallizes into a type V cocoa butter crystal structure.

Quality chocolate with a type V crystal structure has desirable characteristics, such as a shiny surface, a firm texture, a good snap, a melting point which is above typical ambient temperatures but generally around human body temperature and a texture and appearance which will not degrade over time.

Attempts have been made to fashion three dimensional designs with chocolate using a chocolate dispenser (printer) with a controlled placement of material. However, chocolate must be heated above the type VI crystal structure melting point so that the chocolate flows with sufficient ease for printing, while heating chocolate to this printing temperature can cause the chocolate to lose temper. Thus current 3D chocolate printers result in 3D structures which do not have a high percentage of cocoa butter type V crystal structures. Current methods of chocolate printing can result in printed chocolates that lack the required resistance to elevated temperatures and other desirable properties of snap, surface finish, and texture.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment, a method for printing a three-dimensional crystalline structure can include printing a liquid first layer of material with a printer onto a second layer of material having a crystal structure and processing the printed liquid first layer to solidify the first layer wherein, during the processing of the printed liquid first layer, the second layer functions as a crystal seed layer through physical contact with the printed liquid first layer and the second layer crystallizes with the crystal structure.

In another embodiment, a method for printing an edible three-dimensional structure can include printing a molten first material having a first crystal structure with a printer onto a second material having a second crystal structure that is different from the first crystal structure and cooling the molten first material to solidify the first material wherein, during the cooling of the first material, the second material functions as a crystal seed layer through physical contact with the first material.

In another embodiment, a method for printing a three-dimensional chocolate structure can include heating a first chocolate material to a temperature of 40° C. or above so that the first chocolate material has a first cocoa butter crystal structure, printing the heated first chocolate material onto a second chocolate material using a printer, wherein the second chocolate material has a type V cocoa butter crystal structure and, after printing the heated first chocolate material, cooling the first chocolate material to solidify the first chocolate material wherein, during the cooling, the second chocolate material functions as a crystal seed layer through physical contact with the first material such that, subsequent to cooling, the first chocolate material has a type V cocoa butter crystal structure.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
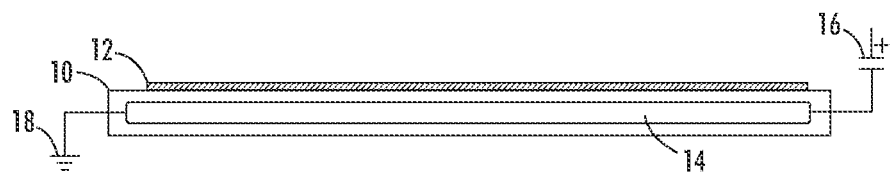
FIGS. 1-4 are cross sections of a first embodiment of the present teachings for printing a three-dimensional structure having a desired crystal structure.

It should be noted that some details of the FIGS. have been simplified and are drawn to facilitate understanding of the present teachings rather than to maintain strict structural accuracy, detail, and scale.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified, a "printer" encompasses any apparatus that performs a deposition of a material onto a substrate. While the present teachings are described herein with reference to a printer that prints an edible material, specifically a chocolate printer, it will be understood that any edible confectionery material or non-edible material which is manufactured to include a particular crystal structure and which is capable of crystallizing through the use of a crystallization nucleus or crystal seed may advantageously incorporate an embodiment of the present teachings. Additionally, for purposes of the present description, the word "ink" is used to refer to any material that is dispensed by the printer, and can include an edible material (e.g., chocolate) and/or an inedible material, for example any element, molecule, compound, or mixture that falls within the scope of the present teachings. Further, unless otherwise specified, a "molten" material includes a material that is in a non-solid form, for example liquid or semi-viscous.

An embodiment of the present teachings can include printing a first material which has an undesired crystal to result in a second material that has a desired crystal shape. The final structure may be a non-edible material used for commercial or consumer purposes. The final structure may also be an edible confection having a desired crystal shape such as a chocolate structure having a three dimensional (3D) shape. The text below describes the present teachings with regard to a chocolate layer, but it will be understood that the present teachings may apply to any edible or inedible materials. In an embodiment, the completed 3D structure may have a desirable crystal configuration, such as a type V cocoa butter crystal structure. An untempered molten chocolate layer can be dispensed or printed upon a tempered chocolate base layer such as a solid chocolate base layer having a type V cocoa butter crystal structure. As the molten chocolate is printed onto the base layer, the solid chocolate base layer functions as a crystal seed layer or crystallization nucleus through physical contact with the printed layer. As the molten chocolate cools, its crystal structure conforms to that of the base layer to result in a 3D structure having a desired cocoa butter crystal structure (i.e., a desired temper).

An embodiment of the present teachings can include a method and in-process structures which can be formed during an embodiment of the present teachings, for example as depicted in FIGS. 1-4 and described in the accompanying text.

FIG. 1 depicts a substrate 10 and a base layer 12 which overlies and/or contacts the substrate 10. The substrate 10 can include a metal layer, a polymer layer, a plastic layer, etc., and may be electrically and/or thermally conductive. The base layer 12 can be a chocolate base layer having a particular crystal structure such as a type V cocoa butter crystal structure. In an embodiment, the base layer 12 can have a thickness of between about 1.0 micrometer (µm) and about 10.0 millimeters (mm), or between about 1.0 µm and about 3.0 mm, or between about 1.0 µm and about 1.0 mm. It is contemplated that a layer thinner than 1.0 µm may be sufficient, and the base layer 12 may include a base layer in dry powder form. The base layer 12 should be sufficiently thick to cover the substrate 10 at least where a 3D structure will be printed. For example, the base layer 12 can cover the entire upper surface of the substrate 10, or a perimeter of the substrate 10 can be exposed around a centrally located base layer 12. A base layer 12 which is insufficiently thick can include undesirable gaps or may fail to retain its crystalline form when hot ink is printed thereon. In certain embodiments of the present teachings, an excessively thick base layer 12 may not allow for processing as described below.

In an embodiment, the base layer 12 can be applied to the substrate 10 as a molten layer having a type V crystal structure which coats at least a portion of an upper surface of the substrate 10. After application, the molten base layer 12 can be cooled such that it solidifies with a type V crystal structure. In another embodiment, the molten base layer 12 applied to the substrate 10 can have a first crystal structure, for example that is not type V (which may be no crystal structure, a type I-type IV crystal structure, a type VI crystal structure, or mixtures thereof), and then tempered after placement on the substrate 10 to have a desired second crystal structure, such as a type V crystal structure. Tempering of the first crystal structure to the second crystal structure can be performed by heating the material on the substrate 10, then cooling the material.

In an embodiment, a thermally conductive substrate 10 can be actively heated with an optional powered internal heat source 14 such as a coil that is electrically connected (i.e., electrically coupled) to power 16 and ground 18, which is heated to a temperature or a series of temperatures in order to temper the liquid, solid, powdered, or granulated base layer 12, or for other uses as described below. In another embodiment, structure 14 can represent an optional powered internal cooling source 14 such as a cooling coil which is cooled to more quickly solidify a melted base layer 12 to decrease manufacturing time. In another embodiment, element 14 can represent both an optional heat source and an optional cooling source, so that the substrate 10 can be heated and cooled as desired.

Figure 2:
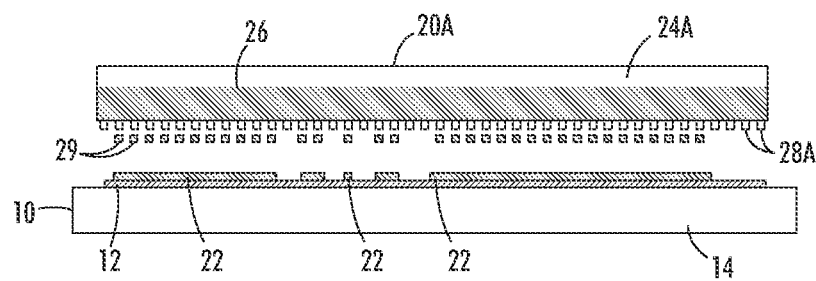

After forming the base layer 12 having a desired crystal structure, a printer 20A is used to deposit a first 3D structure layer 22 onto the base layer 12 as depicted in FIG. 2. It will be apparent to one of ordinary skill in the art that the structures such as printer 20A, substrate 10, etc., depicted in the FIGS. represent generalized schematic illustrations and that other structures or elements can be added or existing structures or elements can be removed or modified. In an embodiment, the printer can include a reservoir 24A which contains a supply of material 26 and, in this embodiment, a plurality of nozzles 28A through which the material 26 is printed or extruded under pressure. For printing of chocolate material 26, the chocolate can be heated to a temperature that is sufficient to melt all of the cocoa butter crystals, for example to a temperature of above 40° C., for example between about 40° C. to about 60° C. Additionally, chocolate at this temperature has a viscosity that is sufficiently low so that the chocolate 26 is ejected or flows easily through the printer 20A and out of the nozzle 28A. However, heating chocolate to this temperature for a low viscosity material causes the chocolate to lose its temper, as the temperatures required to generate the desired in-temper crystals forms a material that is very thick and does not flow with sufficient ease for printing.

Printer 20A may be, for example, a drop-on-demand (DOD) ink jet printer. Ink, for example chocolate, can be ejected as a plurality of droplets 29 through the nozzles using a transducer such as a piezoelectric element which deflects a diaphragm as known in the art. The printer 20A may be a printer other than a DOD ink jet printer, such as an extrusion printer, a solid ink printer, or a printer which uses other ink printing technology. In the case of an extrusion printer, for example, droplets 29 depict extruded material 26. In the case of a DOD printer, for example, the droplets 29 can be simultaneously ejected from the plurality of nozzles 28A as individual droplets but can be printed with sufficient density so as to form a uniform first layer 22 having a desired thickness.

As the first layer 22 is deposited onto the in-temper chocolate base layer 12, the base layer 12 seeds crystallization in the first layer 22. As the first layer cools, its crystals take on the crystal configuration of the base layer 12 to form an in-temper 3D first layer 22. The substrate 10 may be cooled using a powered internal cooling source 14 to decrease cooling time. As will be understood by one of ordinary skill, the first layer 22, as well as subsequent layers as described below, must be cooled slowly enough to allow sufficient crystal growth or formation. Cooling the material too quickly may not allow sufficient time for the nucleating crystals to grow throughout the thickness of the new drop or line of material using the crystal structure of the base layer 12 as a crystal seed layer. In another embodiment, the substrate 10 can be slightly heated to increase cooling time of the chocolate first layer 22 to maximize crystal formation. Additionally, ambient air around the cooling surfaces can be actively or passively dehumidified to reduce or prevent water contamination of the surface. In an embodiment, the ambient air around the cooling surfaces is dehumidified to a humidity of 50% or less.

Figure 3:
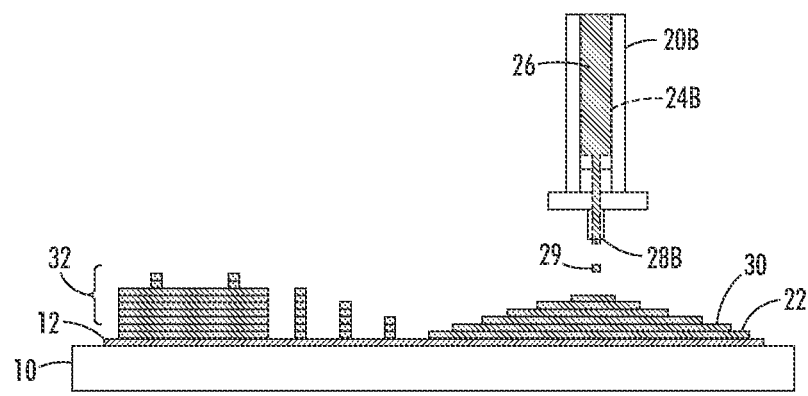

Subsequently, a 3D second layer 30 can be printed using the printer 20B as depicted in FIG. 3. FIG. 3 depicts a different printer 20B for illustration purposes. In contrast to printer 20A having a plurality of nozzles 28A, printer 20B includes a single nozzle 28B which prints all material. Printer 20B can be a single nozzle DOD printer, an extrusion printer, etc. Generally, the same printer may be used to print each of the printed layers.

Because the crystal structure of the 3D first layer 22 takes on the crystal structure of the base layer 12, the second layer 30 takes on the crystal structure of the 3D first layer 22 through physical contact, such that the first layer 22 function as a crystallization nucleus for the second layer 30.

Similarly, any number of additional layers 32 can be printed to build or manufacture a desired 3D shape as depicted in FIG. 3. A delay can be implemented after printing each layer so that a printed layer sufficiently cools and crystallizes before applying a subsequent layer. In an embodiment, the base layer 12 can have a first color, the first layer 22 can have a second color that can be the same or different from the first color, and any of the additional layers 32 can have a third color that is the same or different than the first color and/or the second color.

Figure 4:
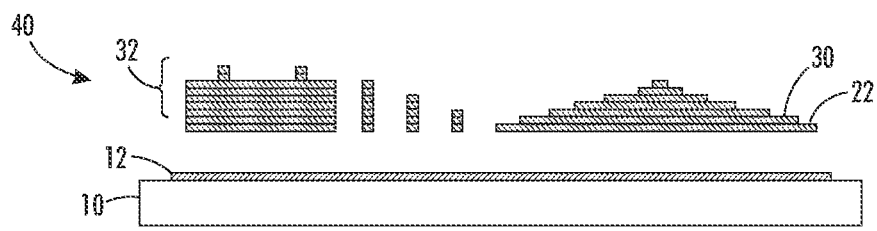

After the 3D structure 40 has been completed, it may be removed from the base layer 12 as depicted in FIG. 4. In an embodiment, the 3D structure may be removed from the base layer 12 using a blade, which may or may not be heated, to separate the 3D layer 40 from the base layer 12. In another embodiment, the optional heat source 14 within the substrate 10 can be heated sufficiently to melt the base layer 12, and the 3D structure 40 can be lifted from the base layer 12 using mechanical techniques or by a human operator. In yet another embodiment, a very thin base layer 12 or a base layer 12 in powder or granulated form is used such that regions of the base layer 12 which do not have an overlying layer of printed material 22, 30, 32 are left behind on the substrate 10 when the 3D structure is removed.

Figure 5:
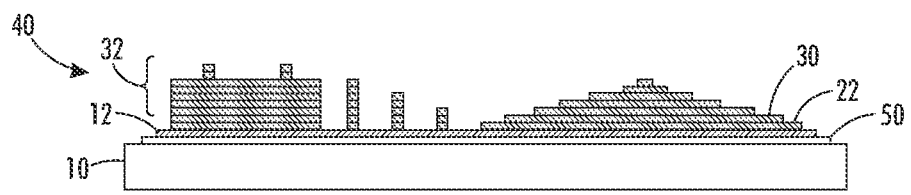
FIG. 5 is a cross section of a second embodiment of the present teachings for printing a three-dimensional structure having a desired crystal structure.

It is contemplated that, generally, the base layer 12 may remain as a part of the completed 3D structure. If the base layer 12 is to remain as part of the 3D structure, the base layer 12 can be formed on a release layer 50 to facilitate removal of the structure including layers 12, 22, 30, and 32 from the substrate 10. In an embodiment, for example when printing a chocolate layer as the ink, the release layer 50 can be a parchment paper or another release layer. As depicted in FIG. 5, the release layer 50 is interposed between the substrate 10 and the base layer 12 to facilitate removal of the 3D structure 40, including the base layer 12, from the substrate 10.

In another embodiment in which the base layer 12 is not part of the 3D structure, the release layer 50 as depicted in FIG. 5 can be placed onto the substrate 10 prior to formation of the base layer 12, or the base layer 12 can be formed on the parchment paper 50, and the assembly including the parchment paper 50 and the base layer 12 can be placed onto the substrate 10. Subsequently, the 3D structure 40 is formed according to the present teachings. Next, the parchment paper 50 with the overlying layers 12, 40 are removed from the substrate 10.

In another embodiment, after forming the 3D structure as depicted in FIG. 5, the parchment paper 50, base layer 12, and 3D structure 40 can be lifted off the substrate 10. Due to the low adhesion of the parchment paper 50, the paper 50 can be peeled off the base layer 12. Next, the base layer 12 can be abraded away using one of the techniques described above, or melted away, to leave the 3D structure 40.

Figure 6:
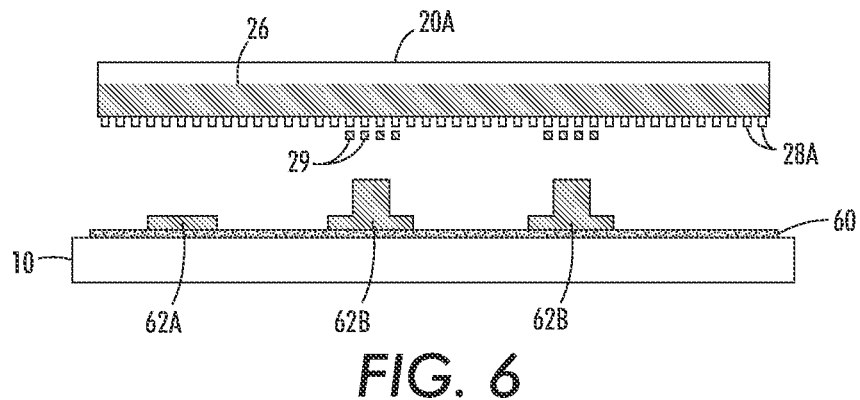
FIGS. 6-8 are cross sections of a third embodiment of the present teachings for forming a three-dimensional structure having a desired crystal structure.
Figure 7:
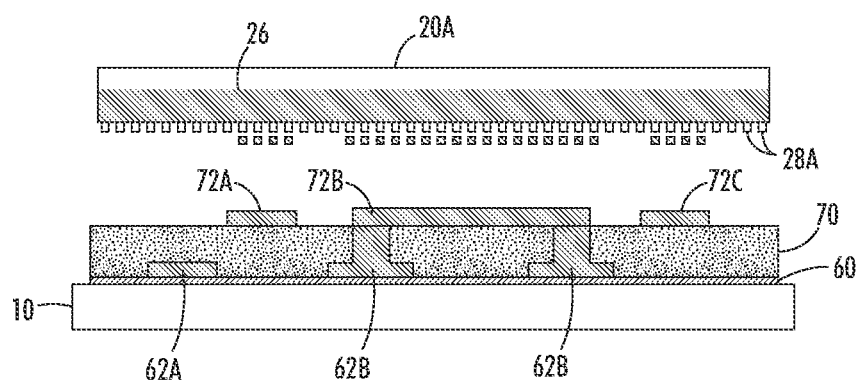
Figure 8:
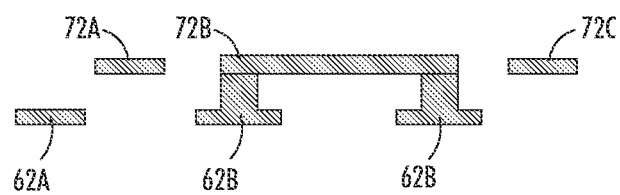

Another embodiment of the present teachings is depicted in the cross sections of FIGS. 6-8. As depicted in FIG. 6, a base layer 60 is formed on a substrate 10 to a sufficient thickness to function as a seed layer for one or more subsequent layers deposited using a printer 20A, such as a DOD printer. In this embodiment, the base layer 60 is a seed layer in crystal powder or granule form. After layering the substrate 10 with the powder base layer 60, the printer 20A prints a desired first layer 62 which includes portions 62A and 62B by ejecting a plurality of ink droplets 29 from the nozzles 28A in accordance with other embodiments of the present teachings. Because the printer 20A is a drop-on-demand printer, various different shapes as desired can be printed. In this embodiment, the base layer 60 has a desired crystal structure while the droplets 29 are heated for printing, and have a crystal structure which is different from the base layer 60. Through contact with the base layer 60, which functions as a crystal seed layer, the printed first layer 62 takes on the crystal form of the base layer 60.

Next, a second layer of crystal powder 70 is applied over the substrate 10 as depicted in FIG. 7. The second layer of crystal powder 70 can include the same material as base layer 60. Subsequently, a second printed layer 72 including portions 72A-C is printed over the crystal powder 70. Through contact with the crystal powder 70, portions 72A and 72C form with the crystal structure of the crystal powder 70 by using the crystal powder 70 as a crystallization nucleus. Portion 72B contacts both the crystal powder 70 and the first layer 62B, and thus forms with the crystal structure of the powder 70 and the first layer 62B. Additional powder layers can be deposited and additional layers can be printed as desired to form a 3D structure.

Next, the powder layers 60, 70 are removed. The powder layers 60, 70 can be removed by any sufficient process, for example by blowing the powder layers away using an air stream, by vacuuming the layers away, by rinsing, or removed using some other removal process. After the crystal powder layers 60, 70 are removed, the desired 3D structure as depicted in FIG. 8 remains.

Thus the present teachings can result in a printed 3D structure, for example a chocolate structure, that has a desired crystalline structure. In the case of chocolate, the 3D structure can have a desirable temper, for example a type V cocoa butter crystal structure. An in-temper base layer can be used as a crystallization nucleus or crystal seed for a printed chocolate layer. The base layer can be formed mechanically without the use of 3D printing. The base layer should be sufficiently thick so as to prevent complete melting to the point of losing its crystalline structure when a drop of chocolate or a chocolate strip at elevated temperatures is printed on top. This base layer then functions as a crystal seed to nucleate crystallization of the chocolate printed on top in the desired form. Subsequent drops or strips of chocolate will then be nucleated by the previous drops in the proper crystal form.

The chocolate in-temper base layer serves a number of purposes. First, by acting as a nucleation site, it accelerates the rate of solidification of the chocolate printed thereon. Second, the chocolates produced using the printer can be in temper. Third, because the printed chocolates are in temper, they have the desirable characteristics associated with in-temper chocolates, such as being more stable with a higher melting point than untempered chocolates, a desirable snap, and a shiny surface.

For use with materials other than chocolate, it is contemplated that a liquid material printed with a non-desirable crystal structure can be processed, for example by heating, to remove (evaporate) one or more solvents or other thinning component and to solidify the liquid material to form a solid layer. As the solvent is removed the liquid printed material is seeded to a desired crystal structure by the base layer as the liquid printed material solidifies.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g.–1, –2, –3, –10, –20, –30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for printing a 3D crystalline chocolate structure, comprising:
    printing a liquid first layer of chocolate material having a first crystal structure with a drop-on-demand printer to cover at least a portion of a second layer of material having a type V cocoa butter crystal structure that is different from the first crystal structure, wherein the printing of the liquid first layer deposits a 3D shape from the drop-on-demand printer onto the second layer of material; and
    processing the printed liquid first layer to solidify the first layer of chocolate material to form at least a portion of the 3D crystalline chocolate structure wherein, during the processing of the printed liquid first layer, the second layer functions as a crystal seed layer through physical contact with the printed liquid first layer such that the liquid first layer of chocolate material having the first crystal structure solidifies to have a type V cocoa butter crystal structure; and
    dehumidifying ambient air around the liquid first layer during the processing of the printed liquid first layer of chocolate.

2. The method of claim 1, further comprising:
    printing a molten first layer of material with a printer onto the second layer of material during the printing of the liquid first layer; and
    cooling the printed molten first layer during the processing of the printed liquid layer.

3. The method of claim 2, further comprising cooling the printed molten first layer to form an edible structure.

4. The method of claim 2, further comprising dehumidifying the ambient air around the printed molten first layer during the cooling of the printed molten first layer to a humidity of 50% or less.

5. The method of claim 1, further comprising evaporating at least one solvent from the printed liquid first layer during the processing of the printed liquid first layer.

6. The method of claim 1, further comprising forming the second layer of material by depositing a powdered or granulated second layer of material to form a crystal seed layer for the printed liquid first layer.

7. The method of claim 1, further comprising ejecting a plurality of droplets of the liquid first layer of chocolate material from at least one printer nozzle during the printing of the liquid first layer of chocolate material.

8. The method of claim 1, further comprising simultaneously ejecting a plurality of droplets of the liquid first layer of chocolate material from a plurality of printer nozzles during the printing of the liquid first layer chocolate of material.

9. The method of claim 1, further comprising:
printing a liquid third layer of chocolate material having the first crystal structure with the drop-on-demand printer onto at least one of the first layer and the second layer using the printer; and
processing the liquid third layer of chocolate material to solidify the third layer into the 3D shape wherein, during the processing of the printed liquid third layer, the at least one of the first layer and the second layer functions as a crystal seed layer through physical contact with the printed liquid third layer such that the liquid third layer of chocolate material having the first crystal structure solidifies to have the a type V cocoa butter crystal structure.

10. The method of claim 9 wherein the first layer has a first color, the second layer has a second color, and the third layer has a third color and the third color is different from at least one of the first color and the second color.

11. A method for printing an edible three-dimensional 3D structure, comprising:
printing a molten first chocolate material having a first crystal structure with a drop-on-demand printer onto a second material having a type V cocoa butter crystal structure that is different from the first crystal structure, wherein the printing of the molten first chocolate material deposits a 3D shape from the drop-on-demand printer onto the second material;
cooling the molten first chocolate material to solidify the first chocolate material into the 3D shape wherein, during the cooling of the first chocolate material, the second material functions as a crystal seed layer through physical contact with the first chocolate material; and
dehumidifying ambient air around the molten first chocolate material during the cooling of the molten first chocolate material.

12. The method of claim 11, further comprising:
heating the molten first chocolate material to a temperature of between about 60° C. to about 45° C. prior to printing the molten first chocolate material; and
printing the molten first chocolate material onto the second material at a temperature of between about 40° C. and about 60° C.

13. The method of claim 11, further comprising:
placing the second material onto a substrate having an internal heat source prior to printing the first chocolate material; and
heating the substrate with the internal heat source to heat the second material.

14. The method of claim 13, wherein the second material has a second crystal structure different from the type V cocoa butter crystal structure during the placement of the second material onto the substrate, and the method further comprises tempering the second material having the second crystal structure to form the second material having the type V cocoa butter crystal structure during the heating of the substrate with the internal heat source.

15. The method of claim 11, further comprising:
placing the second material onto a substrate having an internal cooling source prior to printing the first chocolate material; and
cooling the substrate with the internal cooling source to cool the molten first chocolate material to solidify the first chocolate material.

16. The method of claim 11, wherein:
the printing of the molten first chocolate material prints first chocolate material at a temperature above 40° C.; and
the first crystal structure is no cocoa butter crystal structure.

17. A method for printing a 3D chocolate structure, comprising:
heating a first chocolate material to a temperature of 40° C. or above so that the first chocolate material has a first cocoa butter crystal structure;
printing the heated first chocolate material onto a second chocolate material using a drop-on-demand printer, wherein the second chocolate material has a type V cocoa butter crystal structure, and the printing of the heated first chocolate material deposits the heated first chocolate material in a 3D shape from the drop-on-demand printer;
after printing the heated first chocolate material, cooling the first chocolate material to solidify the first chocolate material wherein, during the cooling, the second chocolate material functions as a crystal seed layer through physical contact with the first material such that, subsequent to cooling, the first chocolate material has a type V cocoa butter crystal structure and the 3D shape; and
dehumidifying ambient air around the first chocolate material during the cooling of the first chocolate material.

18. The method of claim 11, further comprising dehumidifying the ambient air around the first chocolate to a humidity of 50% or less during the dehumidifying.

19. The method of claim 17, further comprising dehumidifying the ambient air around the first chocolate to a humidity of 50% or less during the dehumidifying.

* * * * *